US00RE36746E

United States Patent [19]

Goode, Jr. et al.

[11] E Patent Number: Re. 36,746

[45] Reissued Date of Patent: Jun. 27, 2000

[54] PLASMA DESCALING OF TITANIUM AND TITANIUM ALLOYS

[75] Inventors: Herbert S. Goode, Jr.; Jean A. Nielsen, both of Kent; Larry E. Nitzsche, Bellevue, all of Wash.

[73] Assignee: The Boeing Company, Seattle, Wash.

[21] Appl. No.: 09/154,926

[22] Filed: Sep. 16, 1998

Related U.S. Patent Documents

Reissue of:

[64] Patent No.: 5,681,486
Issued: Oct. 28, 1997
Appl. No.: 08/606,419
Filed: Feb. 23, 1996

[51] Int. Cl.[7] ..... C23C 22/58

[52] U.S. Cl. ..... 148/269; 216/67; 216/75; 216/76; 216/77

[58] Field of Search ..... 216/67, 75, 76, 216/77; 148/269

[56] References Cited

U.S. PATENT DOCUMENTS

| | | | |
|---|---|---|---|
| 3,239,440 | 3/1966 | Covington | 204/141 |
| 3,468,774 | 9/1969 | Kendall | 204/141 |
| 3,632,490 | 1/1972 | Covineton | 204/141 |
| 4,288,283 | 9/1981 | Umezaki et al. | 156/643 |
| 5,108,543 | 4/1992 | Suzuki et al. | 156/643 |
| 5,176,792 | 1/1993 | Fullowan et al. | 156/652 |
| 5,221,424 | 6/1993 | Rhoades | 156/643 |
| 5,354,417 | 10/1994 | Cheung et al. | 156/643 |
| 5,365,515 | 10/1994 | Tahara et al. | 156/643 |
| 5,399,237 | 3/1995 | Keswick et al. | 156/643 |
| 5,419,805 | 5/1995 | Jolly | 156/643.1 |
| 5,467,883 | 11/1995 | Frye et al. | 216/67 |
| 5,843,289 | 12/1998 | Lee et al. | 204/192.3 |
| 5,900,104 | 5/1999 | Lukins, Jr. | 156/345 P |

OTHER PUBLICATIONS

Caplus 1995: 974;077 No Month Available.

*Primary Examiner*—Kishor Mayekar
*Attorney, Agent, or Firm*—Christensen O'Connor Johnson & Kindness PLLC

[57] ABSTRACT

The invention provides a method of removing surface scale from a titanium or titanium alloy substrate. The method includes the steps of heating the substrate to a temperature in the range from about 100° C. to about 600° C., and thereafter subjecting the heated surface to a plasma formed from a gas selected from the group of consisting of $CF_4$ and $SF_6$. The plasma reacts with the surface scale, removing the scale, without attacking the underlying crystalline titanium or titanium alloy. Properly controlled, the plasma reaction terminates when the plasma has penetrated the scale, and encounters the underlying crystalline metal. As a result, the method of the invention is capable of uniform removal of the entire surface scale of a crystalline titanium-containing substrate, without intergranular attack of the substrate.

27 Claims, 1 Drawing Sheet

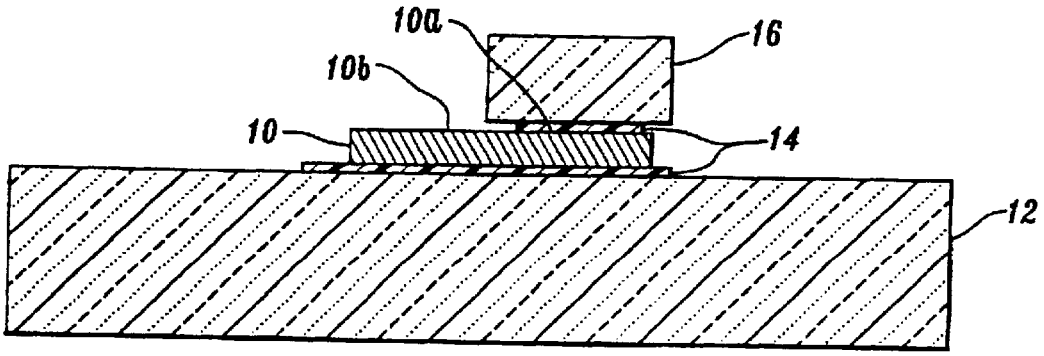
10a
16
10b
10
14
12

PLASMA DESCALING OF TITANIUM AND TITANIUM ALLOYS

Matter enclosed in heavy brackets [ ] appears in the original patent but forms no part of this reissue specification; matter printed in italics indicates the additions made by reissue.

FIELD OF THE INVENTION

The invention relates to the surface treatment of metals and metallic alloys to remove surface scales that arise naturally or from heat treatment processes. More particularly, the invention relates to a method of subjecting the surfaces of titanium and titanium alloy aircraft components to a reactive plasma to remove these surface scales.

BACKGROUND OF THE INVENTION

Titanium and its alloys are used in the fabrication of aircraft. These metals are used to form not only the outer skin of the aircraft, but also internal support structures because of their light weight and high strength. In order to achieve desired physical properties, the titanium alloys are first heat treated. However, heat treatment results in the formation of a dense, tightly adherent oxide on outer surfaces of the metal. This oxide ranges in thickness from about 0.001 to about 0.010 inches and must be removed before subsequent machining, forming or joining operations. Scale covered parts cannot be joined by welding. Alpha case is difficult to machine, causing excessive tool wear and breakage. Also, alpha case scale can cause cracking of the titanium that may result in catastrophic failure.

Generally, in current methods, the oxide scale is removed through treatment of the metal in a series of chemical baths. Some of these chemical baths contain concentrated alkaline solutions while others contain highly toxic and corrosive acids, including nitric acid and hydrofluoric acid. As a consequence, the baths and ancillary equipment that come into contact with these corrosive chemicals must be fabricated from expensive exotic materials that are resistant to attack.

In order to remove the surface oxide scale, the heat treated titanium alloy is immersed in each of the chemical baths for a period of time. The time of immersion is estimated to allow sufficient time for the scale to dissolve in the acids, without significant intergranular attack on the underlying titanium alloy substrate. Such estimates are, at best, inexact, sometimes resulting in overimmersion accompanied by some resultant intergranular attack, or underimmersion, and at other times resulting in the retention of a residual thin scale layer. In some instances, some surfaces of the same aircraft component may be overexposed (and hence etched) on some portions of its surface, and underexposed (and hence retain a thin scale layer) at other portions of its surface. To minimize these effects, parts are sometimes designed with excessive material in areas that will be over-etched, or the areas are covered with masking composition during part of the cycle. Also, the part may be inverted at least once during the etching cycle since upper portions of the part etch faster than lower submerged portions. Some of the hydrogen generated during acid-etching may also migrate into the alloy structure causing "hydrogen-embrittlement"—a serious problem that reduces fatigue strength significantly. To minimize this problem, treated parts may have to be baked to remove the hydrogen. In addition to all of these problems, the chemical bath treatment system generates a hazardous waste containing heavy metal ions that must be disposed of in an environmentally acceptable manner. Such disposal is becoming increasingly costly.

There exists a need for a process of removing the dense oxide scale that forms on titanium and titanium alloy components used in the aircraft industry. The method should generate no, or very little, hazardous waste for disposal. Furthermore, it should be cost effective, allowing rapid cleaning of large components. The process should be controllable to avoid significant intergranular attack of the underlying metal, while at the same time completely removing the surface scale.

SUMMARY OF THE INVENTION

The invention provides a method of removing the oxide scale produced by the heat treatment of crystalline titanium and titanium alloys. The method is particularly well suited for the removal of such scales from large titanium or titanium alloys substrates, such as aircraft components. Moreover, the method generates very little hazardous waste, in comparison with the chemical bath immersion technique. The method is cost-effective and removes scale at a rate of at least about 0.0001, and preferably at least about 0.0005 to about 0.002, inches per hour.

The method includes heating the surface scale-covered titanium or titanium alloy substrate to a temperature that is sufficiently high to promote reaction of chemical components of the scale at commercially useful rates with a plasma generated from a gas that produces fluoride ions, such as $CF_4$ and $SF_6$, and the like. Usually, the substrate is heated to a temperature in the range from about 100° C. to about 600° C. The plasma reacts with the scale, removing the oxide scale and any alpha case. Importantly, this is achieved without intergranular attack on the underlying crystalline titanium or titanium alloy substrate. The plasma reaction self-terminates when the plasma has reacted with the scale and the plasma encounters the underlying metallic substrate. Consequently, the invention provides a method that is not only capable of removing the surface scale, but is also capable of doing so uniformly, on all surfaces of the substrate.

Advantageously, the method of the invention may be carried out in certain commercially available plasma generation chambers, especially when suitably modified in accordance with the invention. Preferably, but not necessarily, the plasma chamber is supplied with either radiation, inductive, kinetic, or conductive heating means so that a titanium or titanium alloy substrate placed within the chamber may be heated to within the desired temperature range, as explained above. Thereafter, the heated component is subjected to plasma that reacts with and removes the surface scale.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings: the FIGURE is a schematic cross-sectional view showing a titanium alloy substrate with one side of its upper surface exposed for etching, and the other side of the upper surface covered with an adhered silicon mask.

DETAILED DESCRIPTION OF THE PREFERRED EMBODIMENT

The invention addresses a significant problem in the surface treatment of heat-treated titanium, and titanium alloys, for removal of thick scales of oxide and alpha case formed during the heat-treatment process. According to the invention, the oxide scale, and alpha case, if any, is readily removed without significant generation of hazardous waste byproducts.

Advantageously, the method of the invention can be practiced using conventional equipment, with suitable modification. Thus, for example, the plasma descaling step may be conducted in any suitable chamber for generation of a plasma from a gas able to produce fluoride ions. The chamber may optionally be modified, by installation of convective, inductive, or radiation heating means, to first preheat the substrate to be treated to a temperature in the range from about 100° C. to about 600° C., preferably about 150° to about 550° C., most preferably about 220° to about 520° C. Otherwise, the titanium or titanium alloy substrate may be preheated in an oven and then transferred to the plasma chamber.

Optionally, in accordance with the invention, the surface of the heat-treated titanium or titanium alloy substrate to be descaled is first cleaned using conventional techniques to remove surface grime and dirt. Since the titanium, or titanium alloy, has been heat-treated, the metal is in crystalline form and the surface scale is tightly adherent to this underlying crystalline metal. Typically, an oxide scale ranges in thickness from about 0.001 to 0.010 inch. Moreover, in some instances a thin scale or layer of alpha case also forms at the surface of the heat-treated metal. This alpha case layer typically has a thickness in the range from 0.001 to about 0.007 inches. As explained above, in order to prepare the metallic part for subsequent machining, forming or joining operations, the surface scales, whether oxide, alpha case, or both, must be removed.

In accordance with the invention, the cleaned metallic substrate is first heated to a temperature in that temperature range where a plasma formed from a fluoride-ion producing gas, such as $CF_4$ or $SF_6$ gas, will react with and remove the scale without intergranular attack on the underlying crystalline metal substrate. Preferably, the substrate is heated to a temperature in the range from about 100° C. to about 600° C., more preferably to a temperature in the range from about 150° C. to about 550° C., and most preferably about 200° C. to about 520° C.

The substrate is optionally preheated outside the chamber and then placed in the chamber, or is heated inside the chamber by radiative, conductive, inductive, or kinetic methods. As is conventional, the chamber is then evacuated to a pressure of about 2 to about 10 Pascal, preferably less than 8 Pascal. Then, the water-free gas from which the plasma is formed, is introduced into the chamber at a flow rate sufficient to produce a useful concentration of fluoride ions. Thus, for instance, for a 6.3 liter volume chamber the flow rate is from about 20 to about 80 standard cubic centimeters per minute fluoride ion-producing gas, along with lesser amounts of water-free oxygen and/or argon at the flow rate of from about 1 to about 5 standard cubic centimeters per minute. The gas from which the plasma is formed may be selected from any of the gasses that produce a fluoride ion when subjected to a radio frequency discharge. Thus, for example, the fluoride ion-producing gas is exemplified by fluorocarbons, sulfur fluorides, phosphorous fluorides, and the like. Preferably, the power concentration is at least about 1.0 watt per centimeter for $SF_6$, and at least about 0.5 watts per centimeter for $CF_4$.

By controlling the temperature of the substrate, descaling may be achieved without intergranular attack of the underlying crystalline metal. Optionally, thereafter, the temperature of the substrate may be carefully raised to allow light etching of the substrate surface. Advantageously, however, in accordance with the invention, the plasma reaction self-terminates when the plasma has reacted with all the scale, whether oxide or alpha case, and the plasma encounters the underlying crystalline metallic substrate. Since alpha case forms unevenly over the surface of the metallic substrate, the removal of the alpha case results in a surface that has a certain roughness, by microelectronic standards. However, the surface finish is excellent by aerospace standards.

Importantly, aerospace titanium pans to be welded typically have a surface finish of Ra ranging from about 30 to about 60. This surface finish range is achieved using the plasma descale process of the invention alone, without further treatment. The prior an chemical tank immersion processes, described above, typically produce rougher surfaces, surfaces having Ra's in the range about 40 to about 120.

The surface produced by the descaring process of the invention is suitable for dye penetrant inspection. Importantly, since the titanium substrate is not exposed to hydrogen during the process of the invention, the risk of hydrogen embrittlement does not arise. Moreover, the need for subsequent baking cycles to remove entrapped hydrogen is eliminated.

The following example illustrates the method of the invention and is not limiting of the invention as described above and claimed herebelow.

EXAMPLE 1

Two samples of heat-treated titanium alloy were descaled, one in $SF_6$ and the other in $CF_4$ plasmas. Each sample measured 0.5×1.5 inches and was 0.125 inches thick. Since the 6.3 liter volume plasma chamber used for descaling was only able to accept 5-inch wide wafers, each sample 10 was adhered to an upper surface of a 5-inch silicon wafer 12 with photoresist material 14 in order to lead the sample into the chamber, as illustrated in the FIGURE. Moreover, in order to provide a comparison between the descaled and original surfaces, one side of the upper surface 10a of each sample was covered with a strip of silicon 16 adhered to the face of the sample with photoresist 14 to provide a mask, while the other side 10b was exposed to the plasma.

The descaling with $CF_4$ was carried out with a flow rate of 45 ccs per minute of $CF_4$ through the chamber, along with 2 ccs per minute of oxygen. The plasma descaling was carried out for in periods of 30 minutes, that included 6 cycles at 200 watts, 6 cycles at 300 watts, and thereafter a further cycle at 300 watts. The total descaling time was 6 hours and 30 minutes.

The $SF_6$ descaling was carried out with a flow rate of 45 ccs per minute of $SF_6$ and 2 ccs per minute of oxygen for a total of 2 hours. The descaling included 3 15-minute cycles at 350 watts, 4 15-minute cycles at 400 watts, and a final 15-minute cycle at 400 watts.

Each sample was descaled until its surface appeared visually clear, and free of surface scale. Scale removal was confirmed by cross section of the specimens and examination at 1,000 times magnification. No intergranular attack was visible.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. A method of removing a heat-treatment induced scale from surfaces of an underlying crystalline titanium or titanium alloy body of an aircraft component, the method comprising:

(a) heating at least the surfaces of the aircraft component having the heat-treatment induced scale to a temperature in the range from about 100° C. to about 600° C.;

(b) removing the scale from the surfaces by reacting the heated surfaces of the aircraft component with a plasma formed from a gas selected from the group consisting of $CF_4$ and $SF_6$ to remove the scale without intergranular attack of the underlying crystalline titanium or titanium alloy body beneath the scale; and (c) auto-terminating the reacting when the plasma has reacted through the scale and encounters the underlying crystalline titanium or titanium alloy body.

2. The method of claim 1, wherein the scale comprises an oxide scale from about 0.001 to about 0.005 of an inch in thickness.

3. The method of claim 1, wherein heating of step (a) comprises heating to a temperature is in the range from about 220° C. to about 520° C.

4. The method of claim 1, wherein the titanium alloy is Ti-6A1-4V.

5. The method of claim 1, wherein the step of heating comprises heating by heating in an enclosed vacuum chamber.

6. The method of claim 5, wherein the reacting with plasma is in the enclosed chamber.

7. The method of claim 1, wherein the scale comprises alpha case.

8. The method of claim 1, wherein the reacting is at a rate sufficient to remove at least about 0.0005 to about 0.002 of an inch per hour.

9. A method of removing a heat-treatment induced scale from surfaces of a titanium or titanium alloy substrate, the method comprising:

(a) heating at least the surfaces of the substrate having the heat-treatment induced scale to a temperature in the range from about 220° C. to about 520° C., (b) subjecting the heated substrate to a reactive plasma, containing fluoride ions to remove the scale, without intergranular attack of the titanium or titanium alloy substrate; and (c) terminating the subjecting step when the plasma has reacted through the scale and encounters underlying crystalline titanium or titanium alloy of the substrate.

10. The method of claim 9, wherein the subjecting comprises subjecting to a plasma of a gas selected from the group consisting of fluorocarbon compounds, sulfur fluorides and phosphorous fluorides.

11. The method of claim 9, wherein the subjecting to a plasma to remove scale comprises subjecting to a plasma at a concentration and under temperature conditions to cause removal of the scale at a rate of from about 0.0005 to about 0.002 inches per hour.

12. A method of removing a scale from surfaces of titanium or titanium alloy substrates, the method comprising:

(a) heating the substrate to a sufficient temperature to allow chemical components of the scale to react with a plasma generated from a gas selected from the group consisting of fluorocarbons, phosphorous fluorides and sulfur fluorides at a rate that removes at least about 0.0001 inch per hour from the scale; and (b) reacting the scale with a plasma generated from the gas, the step of reacting carried out without intergranular attack of underlying substrate metal.

13. The method of claim 12, wherein the heating is to a temperature in the range from about 220° to about 520° C.

14. The method of claim 12, wherein the heating comprises heating to react at a rate of about 0.0005 to about 0.002 inches/hr.

15. The method of claim 12, wherein the heating is to a temperature in the range about 100° C. to about 600° C.

*16. The method of claim 1, wherein removing step (b) comprises reacting the heated surfaces of the aircraft component with the plasma within an enclosed vacuum chamber at a pressure below atmospheric.*

*17. The method of claim 16, wherein the pressure is below 10 Pascal.*

*18. The method of claim 17, wherein the pressure is below 8 Pascal.*

*19. A heat treated titanium aircraft component produced in accordance with the method of claim 1, wherein the titanium aircraft component is free of scale and intergranular attack.*

*20. The titanium aircraft component of claim 19, wherein the titanium aircraft component is free of hydrogen inclusion so that hydrogen content of the titanium aircraft component is substantially the same as the content of the titanium aircraft component before the heat treatment that produced the scale.*

*21. The method of claim 9, wherein subjecting step (b) comprises subjecting the heated substrate to the reactive plasma within an enclosed vacuum chamber at a pressure below atmospheric.*

*22. The method of claim 21, wherein the pressure is below 10 Pascal.*

*23. The method of claim 22, wherein the pressure is below 8 Pascal.*

*24. A heat treated titanium part produced in accordance with the method of claim 1, wherein the part is free of scale and intergranular attack.*

*25. The substrate of claim 24, wherein the titanium aircraft component is free of hydrogen inclusion so that hydrogen content of the titanium aircraft component is substantially the same as the content of the titanium aircraft component before the heat treatment that produced the scale.*

*26. A heat treated titanium part that is free of scale and intergranular attack.*

*27. The heat treated titanium part of claim 26, wherein the titanium aircraft component is free of hydrogen inclusion so that hydrogen content of the titanium aircraft component is substantially the same as the content of the titanium aircraft component before heat treatment.*

* * * * *

UNITED STATES PATENT AND TRADEMARK OFFICE

CERTIFICATE OF CORRECTION

PATENT NO. : Re. 36,746
DATED : June 27, 2000
INVENTOR(S) : H.S. Goode, Jr. et al.

It is certified that error appears in the above-identified patent and that said Letters Patent is hereby corrected as shown below:

| COLUMN | LINE | ERROR |
|---|---|---|
| 6 (Claim 24, line 2) | 46 | "claim 1" should read --claim 9-- |

Signed and Sealed this

Nineteenth Day of June, 2001

*Attest:*

Nicholas P. Godici

*Attesting Officer*

NICHOLAS P. GODICI
*Acting Director of the United States Patent and Trademark Office*